United States Patent [19]
Jackson et al.

[11] Patent Number: 5,990,941
[45] Date of Patent: Nov. 23, 1999

[54] METHOD AND APPARATUS FOR THE INTERACTIVE DISPLAY OF ANY PORTION OF A SPHERICAL IMAGE

[75] Inventors: Laban Phelps Jackson; Alexis S. Pecoraro; Peter Hansen, all of Knoxville; Martin L. Bauer, Oak Ridge; H. Lee Martin, Knoxville, all of Tenn.

[73] Assignee: Interactive Pictures Corporation, Oak Ridge, Tenn.

[21] Appl. No.: 08/516,629

[22] Filed: Aug. 18, 1995

Related U.S. Application Data

[63] Continuation-in-part of application No. 08/494,599, Jun. 23, 1995, which is a continuation-in-part of application No. 08/386,912, Feb. 8, 1995, which is a continuation of application No. 08/339,663, Nov. 14, 1994, which is a continuation of application No. 08/189,585, Jan. 31, 1994, Pat. No. 5,384,588, which is a continuation-in-part of application No. 07/699,366, May 13, 1991, Pat. No. 5,185,667, and a continuation-in-part of application No. 08/373,446, Jan. 17, 1995, which is a continuation-in-part of application No. 08/189,585, Jan. 31, 1994, Pat. No. 5,384,588.

[51] Int. Cl.$^6$ .................................................. H04N 5/30
[52] U.S. Cl. .................... 348/207; 348/147; 348/335; 348/36; 382/293
[58] Field of Search .................................. 348/207, 222, 348/239, 36, 39, 47, 48, 143, 147, 576, 578, 580, 583, 335; 382/268; 359/708, 718, 725, 728, 364, 363; 345/425, 427, 435, 126; H04N 5/30

[56] References Cited

U.S. PATENT DOCUMENTS

| | | |
|---|---|---|
| 4,152,724 | 5/1979 | Hunter . |
| 4,463,380 | 7/1984 | Hooks, Jr. . |
| 4,549,208 | 10/1985 | Kamejima et al. . |
| 4,736,436 | 4/1988 | Yasukawa et al. . |
| 4,772,942 | 9/1988 | Tuck . |
| 4,807,158 | 2/1989 | Blanton et al. . |
| 4,858,149 | 8/1989 | Quarendon . |
| 4,899,293 | 2/1990 | Dawson et al. . |
| 4,965,844 | 10/1990 | Oka et al. . |
| 5,023,725 | 6/1991 | McCutchen . |
| 5,067,019 | 11/1991 | Juday et al. . |
| 5,068,735 | 11/1991 | Tuchiya et al. . |

(List continued on next page.)

FOREIGN PATENT DOCUMENTS

| | | |
|---|---|---|
| 011909 | 6/1984 | European Pat. Off. . |
| 2-127877 | 5/1990 | Japan . |
| WO 82/03712 | 10/1982 | WIPO . |
| WO 96/26610 | 8/1996 | WIPO . |

OTHER PUBLICATIONS

A method of modeling sky for computer animation, Ned Greene; Computer Graphics World, DVI Video/Graphics, Douglas F. Cixon et al. Jul. 1987; Digital Processing of Images Taken By a Fish–eye Lens, Morio Onoe et al., 1982.

(List continued on next page.)

*Primary Examiner*—Michael H. Lee
*Attorney, Agent, or Firm*—Banner & Witcoff, Ltd.

[57] ABSTRACT

Apparatus for interactive display of any portion of a spherical image preferably comprises a personal computer or other digital processor apparatus for storing digital data representative of at least one image having a 180 degree or greater field of view (or hemispherical image). In order to view a selected image portion without warp or distortion at the seam between opposite hemispherical images, edge filtering is applied to eliminate a halo effect. Moreover, an opposite hemispherical image may either be obtained by creating a mirror image of a first hemispherical image or by capturing a second hemispherical image by means of an oppositely directed camera and storing the digital image. Equations for image transformation are based on a lens' characteristics including the lens' radius R. An input interface preferably comprises a display including a magnification region and a directional cursor for pointing the direction to a next spherical image. "Hot spots" can be linked to audio, text, graphics, or other media or trigger a charge for a pay event or identify program links to the next spherical image.

6 Claims, 9 Drawing Sheets

U.S. PATENT DOCUMENTS

| | | |
|---|---|---|
| 5,130,794 | 7/1992 | Ritchey . |
| 5,175,808 | 12/1992 | Sayre . |
| 5,200,818 | 4/1993 | Neta et al. . |
| 5,396,583 | 3/1995 | Chen et al. . |
| 5,446,833 | 8/1995 | Miller et al. . |
| 5,561,756 | 10/1996 | Miller et al. . |

OTHER PUBLICATIONS

G. David Ripley, "DVI—A Digital Multimedia Technology", Communications of the ACM Jul. 1989 vol. 32, No. 7, pp. 811–822.

M. Onoe et al., "Digital Processing of Images Taken by Fish-Eye Lens", IEEE: Proceedings, New York, 1982, vol. 1, pp. 105–108.

N. Greene, "Environment Mapping and Other Applications of World Projections", IEEE Computer Graphics and Applications, Nov. 1986, pp. 21–29.

N. Greene, "A Method of Modeling Sky for Computer Animations", Proc. First Int'l. Conf. Engineering and Computer Graphics, Aug. 1984, pp. 297–300.

J. Blinn et al., Texture and Reflection in Computer Generated Images, Comm. ACM, vol. 19, No. 10, 1976, pp. 542–547.

N. Greene et al., "Creating Raster Omnimax Images from Multiple perspective Views Using the Elliptical Weighted Average Filter", IEEE Computer Graphics and Applications, Jun. 1986, pp. 21–27.

R. Kingslake, "Optical System Design", Academic Press, 1983, pp. 86–87.

S. Ray, "The Lens in Action", Hastings House, 1976, pp. 114–117.

F. Pearson II, "Map Projections Theory and Applications", CRC Press, Inc., 1990, pp. 215–345.

A. Paeth, "Digital Cartography for Computer Graphics", Graphics Gems, 1990, pp. 307–320.

G. Wolberg, "Digital Image Warping", IEEE Computer Society Press, 1988.

F. Kenton Musgrave, "A Panoramic Virtual Screen for Ray Tracing", Graphics Gems, 1992, pp. 288–294.

J.D. Foley et al., "Computer Graphics: Principles and Practice", 1990, 1996, pp. 229–381.

Intel Corporation, "Action Media 750 Production Tool Reference", 1988, 1991.

S. Morris, "Digital Video Interactive—A New Integrated Format for Multi-Media Information", Microcomputer for Information Management, Dec. 1987, 4(4):249–261.

"Declaration of Scott Gilbert in Support of Defendant Infinite Pictures" Memorandum in Opposition to Plaintiff's Motion for Preliminary Injuction, Omniview, Inc. V. Infinite Pictures, Inc., Civ. Action No. 3–96–849.

Video Tape—IPIX v. Infinite Pictures, Ref. No. 01096.58462, Exhibit Nos. 216 & 217.

Two (2) Japanese prior art articles authorized by Dr. Morio Kuno (1980).

Heckbert, "Fundamentals of Texture Mapping and Image Warping", Report No. UCB/CSD 89/516, Jun. 1989.

Heckbert, "The PMAT and Poly User's Manual", NYIT Document, 1983.

Data Sheets for Imaging Products, Defendant's Exhibit 202, pp. 40–63.

Data Sheets for TMC2301, TMC2302, Defendant's Exhibit 402, 1 sheet.

Data Sheets for Simplified Block Diagram, Plaintiff's Exhibit 409, pp. 41–77.

Communications Of The acm, "Interactive Technologies", Association for Computing Machinery, vol. 32, No. 7, Jul. 1989.

Science & Technology, Mar. 6, 1995, pp. 54–55, NASA's Tiny Camera Has A Wide-Angle Future, Larry Armstrong and Larry Holyoke.

CAMERA ORIENTATION FOR TOP IMAGE

USP 5,185,667 WIDE ANGLE "THIN" LENS ASSUMPTION.

FISHEYE LENS ASSUMPTION THAT CORRECTS FOR EDGE CONSIDERATIONS

TOP OF 180 DEGREE IMAGE PLANE

BOTTOM OF 180 DEGREE IMAGE PLANE

TOP 180 DEGREE IMAGE

BOTTOM 180 DEGREE IMAGE

FIG. 8

A PIXEL IN THE OBJECT PLANE (u,v) IS MAPPED TO THE PIXEL( ) IN THE IMAGE PLANE BY THE FOLLOWING TRANSFORMATION WHERE:

$\emptyset p$ - PAN ANGLE
$\emptyset t$ - TILT ANGLE
$\beta$ - ROTATION ANGLE
m - MAGNIFICATION
R - IMAGE RADIUS
(u,v) - COORDINATES OF A PIXEL IN THE OBJECT PLANE RELATIVE TO THE OBJECT PLANE COORDINATE FRAME
(x,y) - PIXEL IN THE IMAGE CIRCLE RELATIVE TO THE IMAGE PLANE COORDINATE FRAME CORRESPONDING TO PIXEL (u,v) IN THE OBJECT PLANE
P = (Px, Py, Pz) - LOCATION OF (u,v) RELATIVE TO THE IMAGE PLANE COORDINATE FRAME
a - INCLUDED ANGLE BETWEEN THE AXIS OF THE LENS AND POINT P

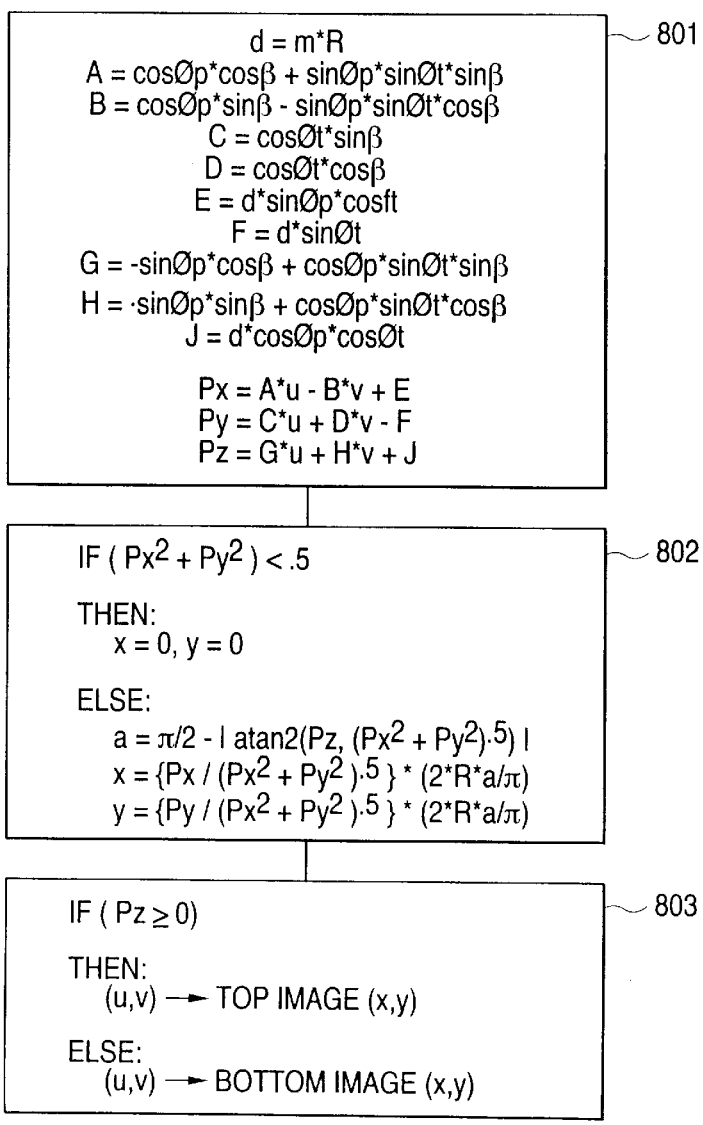

METHOD AND APPARATUS FOR THE INTERACTIVE DISPLAY OF ANY PORTION OF A SPHERICAL IMAGE

This application is a continuation-in-part of U.S. application Ser. No. 08/494,599, filed Jun. 23, 1995, entitled "Method and Apparatus for Simultaneous Capture of a Spherical Image" of Danny A. McCall and H. Lee Martin, which is a continuation-in-part of a U.S. application Ser. No. 08/386,912 filed Feb. 8, 1995, which is a continuation of U.S. application Ser. N . 08/339,663 filed Nov. 14, 1994, which is a continuation of U.S. application Ser. No. 08/189,585 filed Jan. 31, 1994 (now U.S. Pat. No. 5,384,588), which is a continuation-in-part of U.S. application Ser. No. 07/699,366 filed May 13, 1991 (now U.S. Pat. No. 5,185,667). This application is also a continuation-in-part of U.S. application Ser. No. 08/373,446 filed Jan. 17, 1995, which is a continuation-in-part of U.S. application Ser. No. 08/189,585 filed Jan. 31, 1994 (now U.S. Pat. No. 5,384,588).

BACKGROUND OF THE INVENTION

1. Technical Field

This invention relates generally to the field of image processing systems and, more particularly, to an apparatus and method for displaying a portion of a spherical image field that is created from one or two 180 degree or greater hemispherical images, generated from either a still photograph, rendered image, or a motion picture or video input. Specifically, the present invention relates to a system where desired portions of one or two 180 degree images are used to create a dewarped and perspective-corrected window into the image or images. The method involves the use of a mathematical transformation to remove distortion associated with a fisheye or other wide angle lens, correct perspective associated with changes in the direction of view, and select which hemisphere of the original images a given picture element resides. In addition, the method creates an environment that totally fills a spherical environment resulting in no boundaries, thus, creating a so-called immersive image viewing experience. It does so preferably by combining two images into a complete sphere (i.e. permitting continuous navigation without any boundaries in the spherical image). The image can be composed of a single half image with the second half composed of the mirror image of the first image or a second hemispherical image that is captured by a camera directed in the opposite direction of the first. The preferred system includes a computational device for implementation of the corrective algorithms (personal computer, TV settop device, or hardware for computation of the transformations), an input device (a computer mouse, touchscreen, keyboard or other input device), a display monitor (a television, computer monitor or other display device), and image data that is collected from either one or two 180 degree or greater (for example, fisheye) images that are still, rendered, motion or video.

2. Background Art

The discussion of the background art related to the invention described herein relates to immersive image viewing. "Immersive image viewing" as used in the context of this application means the concept of permitting a viewer to be totally immersed in an image by allowing the user, for example, to focus on a particular object in an object plane and selectively having that image displayed in an image plane without warping or distortion as if the user had seen the object with his or her eyes.

One goal of the present invention is to create an immersive image environment and another to provide a means for the user to experience such a totally immersive image environment, providing full freedom in the viewing direction inside of a complete sphere composed of one or two combined hemispherical images. As a result, there are no bounds on the user's freedom to view in any direction.

Some virtual reality approaches have been developed that use multiple images to capture a cylindrical representation of an environment from a composition of numerous still images (Apple Computer's QuickTimeVR) or a cylindrical image from a mechanized panoramic camera (Microsoft Corporation's Surround). Apple's QuickTimeVR may be described by Chen et al., U.S. Pat. No. 5,396,583. These methods suffer from at least two constraints: 1) the capture of the image requires precise methods and equipment not amenable to consumer application, and 2) the playback to the user is limited by the cylindrical composition providing a 360 degree panorama all the way around but a limited tilt in the vertical (up/down) direction.

In parent U.S. Pat. No. 5,185,667, an approach is described which uses a single image and allows navigations about the single image. The described method involves the capture of a single wide angle image (not a complete spherical image) and is thus limited in the effect on the user by having limits set at the edge of the wide angle field of view, thus constraining the user to a region of view direction.

Other methods (for example, a system under development at Minds Eye View of Troy, New York) are expected to use image projection to create alternative perspectives from dual fisheye images and process these images in a manual manner to create a composite of images that can be videotaped to create the sense of movement through environments. These alternative perspectives are combined, frame by frame, offline and, consequently, due to the computational complexity of the approach, real-time interaction has not been possible. This approach offers no interactive potential to allow the user to direct his own view and lacks accuracy at the seam between perspectives to automatically combine images without manual touch up (editing) of the original fisheye images.

Approximations based on bilinear interpolation (Tararine, U.S. Pat. No. 5,048,102) as applied to a distorted image allow for computational speed increases, but are limited to a fixed viewing perspective and to a single source of input data (hemisphere) instead of an entire sphere of input for total immersion which requires additional logic to determine from which source to obtain the information.

Still other approaches provide a higher resolution in the video domain by combining numerous narrow angle imaging devices in an approximately seamless manner (McCutchen, U.S. Pat. No. 5,023,725), but these devices require the combination of numerous signals into a composite image and also are only piecewise continuous having issues (distortions) at the intersection of various sensors (parallax).

SUMMARY OF THE INVENTION

The problems and related problems of the prior art are overcome by the principles of the present invention. Rather than the approaches taken by the prior art, the approach described herein for providing immersive image viewing uses, by way of example only, a top side and bottom side (top hemisphere and bottom hemisphere) representation of a spherical image as will be described in greater detail with reference to FIGS. 4–9. These figures assume a camera pointed directly upward to capture a top side image (and downward to capture a bottom side image or, alternatively, the first captured image is axis-reversed to form a mirror image). Actually, any directional representation could have easily been shown and used, for example, by directing a camera to the left and to the right, or in other directions so long as an entire spherical image is obtained, preferably by capturing only two hemispherical or 180 degree images and combining them or combining a first captured image with its mirror (axis-reversed) image.

The method of the present invention provides a real-time interactive image window that can be directed anywhere in a sphere by using either a single wide angle lens (such as a fisheye lens) snapshot (and transforming its mirror image when on the bottom side) or automatically combining two fisheye lens captured images with seam filtering. The result is a totally immersive image of perspective corrected view. The approach can be performed on readily available personal computers and, with the appropriate image input, can be performed on still images, rendered images, motion picture images or full motion video inputs. For example, fisheye distortion and perspective correction equations have been implemented which are customized to the lens used at key locations in the image and then linearized to provide a faithful transformation of the image. The process results in automatic seam minimization, reducing pixel address cumulative error to less than 2 pixels from the absolute transform while providing responsive transformational performance. The result is an accurate and responsive implementation that enables dual fisheye images to be perfectly seamed together so that no seam is visible to the viewer. Similarly, the technique can be applied with a single fisheye image to provide an immersive image with only a single hemispherical input image. The method determines a Z axis value to determine from which input image the needed output pixel is found. A positive Z value, for example, denotes a top side view and a negative value a bottom side view. "Z axis" is actually intended to define any axis so long as it corresponds to the axis of direction of the lens of a camera capturing the image. Again, "Z axis" is not intended to be limiting as, for example, it may comprise in a left/right visualization an X axis (or a Y axis), and a plus or minus X axis value could be used.

1. Objects of the Invention

Accordingly, it is an object of the present invention to provide a method for interactive display of an image composed totally or in part from picture elements captured digitally from one or two fisheye images, still or full motion.

Another object of the invention is to provide the user with an input means to direct the image by use of a computer mouse.

Another object of the invention is to provide the user with an input means to direct the image by use of a keyboard.

Another object of the invention is to provide the user with an input means to direct the image by use of a touchscreen.

Another object of the invention is to provide the user with an input means to direct the image by use of a joystick.

Another object of the invention is to provide the user with the ability to pan, tilt, rotate, and magnify throughout an entire sphere comprised of two opposing hemispherical fisheye images.

Another object of the invention is to provide the user with the ability to pan, tilt, rotate, and magnify throughout an entire sphere comprised of one hemispherical fisheye image that is used with its mirror image to create a complete sphere.

Another object of this invention is to allow display of real-time full motion video directed at the discretion of the user.

Another object of this invention is to allow display of high resolution still images directed at the discretion of the user.

Another object of the invention is to allow the placement of active areas ("hot spots") on the images that allow the sequencing of images or other information (text, video, audio, other spherical images, etc . . . ) when activated by selection with the mouse, joystick, or keyboard.

Another object of the invention is to allow combination of multiple image files sequentially to allow the user to navigate through images in a controlled sequence.

According to the principles of the present invention, a database composed at least of one 180 degree field of view (for example, fisheye lens captured) image or of two opposing 180 degree fisheye images is used to construct a perspective corrected, distortion removed image that can be pointed in any direction in an immersive sphere. The image database can be composed of a single 180 degree hemispherical image captured from a live video source, a still image from a still camera or an image series from a motion picture camera with the second half of the image created with the mirror image of the single image or a second image taken in the opposite direction from the first.

Techniques for capturing first and second images having an equal to or greater than 180 degree field of view are described in copending U.S. application Ser. No. 08/494,599, entitled "Method and Apparatus for Simultaneous Capture of a Spherical Image," of Danny A. McCall and H. Lee Martin, filed Jun. 23, 1995 (Attorney Docket No. 1096.49900), incorporated by reference herein as to its entire contents. These are combined to form a "bubble" or sphere and a sequence of such spheres may be combined to comprise a tour as will be further described herein in connection with a discussion of FIG. 11.

Still image files are preprocessed to determine the border, center and radius of the fisheye image. Edge filtering (also referred to herein as seam filtering) is also automatically applied to eliminate the "halo" effect caused on the last few pixels at the rim edge of the image. This rim halo causes the outermost pixels that are a part of the image to be dimmed. The thickness of this dimming is only a few pixels, and the edge filtering is performed in a radial manner using linear pixel filtering and replication techniques across the radial vector that points from the perimeter to the center of each of the images. The resulting filtered image can be saved in the initial format ready for use by the image transformation system. The resulting cropped, seamed, scaled and filtered image is then saved in a format that can be used at a later time via hard disk media or transmitted over electronic networks. The ability to automatically create these files from a single image or a dual image is afforded by the accuracy of the method used to transform the images which corrects for distortion and perspective correction.

The archived spherical images are augmented by creation of active regions on the image that allow the user to interact with files saved with the image. These hot spots are created with a pixel editing program that allows the user to designate regions as areas of interest and name them for later programming reference. Once the hot spots have been created, the file may be compressed and formatted for size and color depth depending on how the image is to be delivered for display (for example, for CDROM, games, Internet, local area or private data network or other delivery).

Then, the hot spots together with sound, movies, text graphics or other related data are linked together to create a multimedia title. The end user of the device controls the direction of the view by moving a computer mouse, selecting a control button, or depressing control keys on a keyboard. Selection of the hot spots is accomplished, for example, by double-clicking the mouse within the hot spot and then the appropriate sound, text, or other image is displayed as summoned by computer code associated with the hot spot.

Through the use of perspective correction and manipulation disclosed in U.S. Pat. No. 5,185,667 and its progeny including U.S. Pat. Nos. 5,384,588; 5,359,363 and 5,313, 306 and U.S. patent application Ser. Nos. 08/189,585, 08/339,663 and 08/373,446, the formed seamless image may be explored. The exact representation of the transformation provided by this approach allows the seamless edges to be produced when the data is collected in a controlled manner.

Preferably, a personal computer system runs the perspective correction algorithms. These computers may be directly linked to the image capturing system (allowing live, full motion video from a video camera or still image manipulation from a digital still camera or scanned from a slide) or may remain completely separate (processing previously captured images from a compact disk read only memory (CD-ROM) or electronic network distribution of the image).

BRIEF DESCRIPTION OF THE DRAWINGS

The above mentioned features of the invention will become more clearly understood from the following detailed description of the invention read together with the drawings in which:

FIG. 8 shows the calculation progression and the decision made as to which side of the sphere the data resides.

DETAILED DESCRIPTION OF THE PREFERRED EMBODIMENTS

Figure 1:
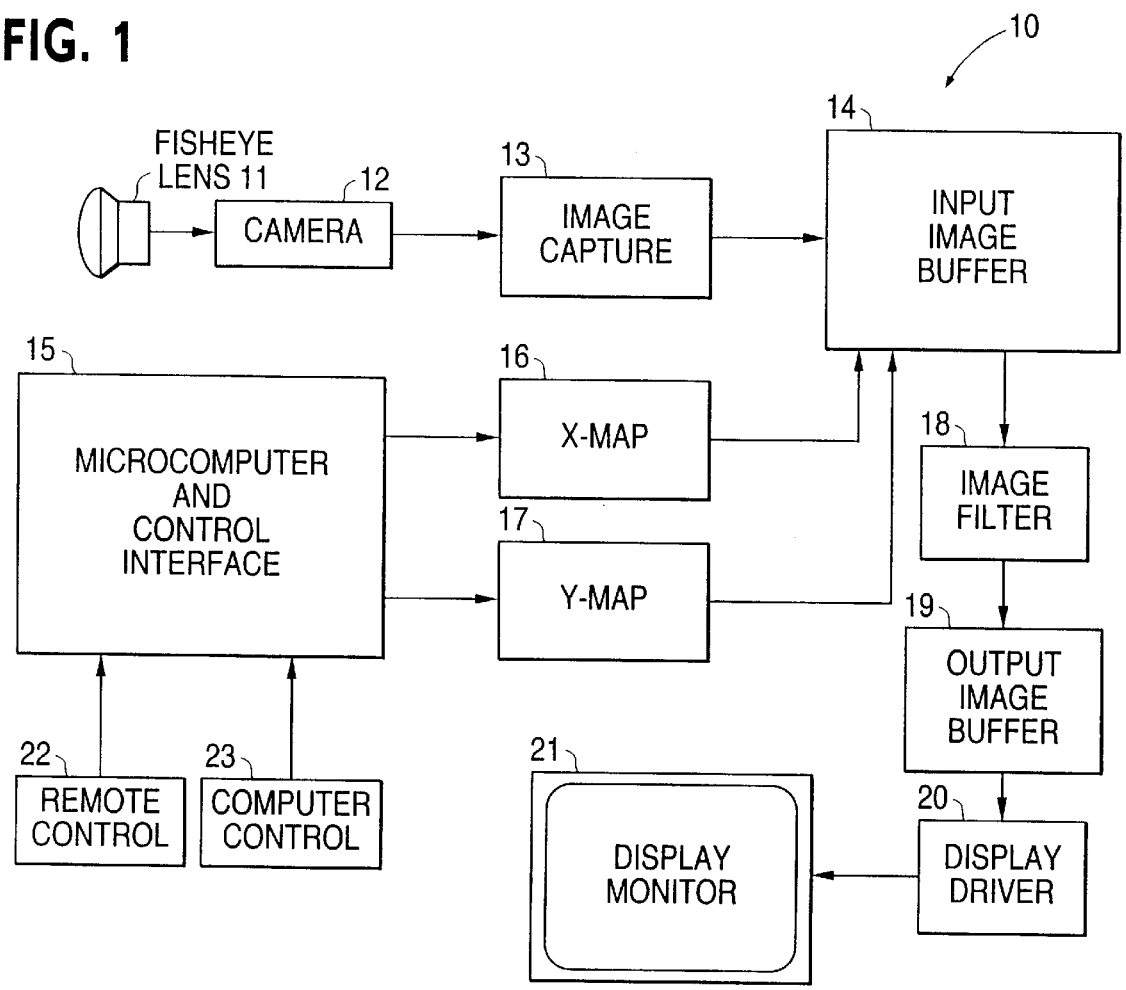
FIG. 1 is a block diagram of the fundamental image transformation system using a microprocessor computer to determine the horizontal and vertical locations of the pixel in the input image to transform and create an output image and display it.

A system for interactively displaying a spherical image comprises apparatus shown in block diagram form in FIG. 1. The apparatus is used to transform a digitized input image from a camera 12 (video or still, live or stored) into an output image for display via computer monitor, TV or other display 21 by calculating the image transform in hardware 15, 16, 17, 10, 18, 19, 20 (computer or hardwired logic) under the interactive control of a human operator or external computer system using controls 22, 23 to direct the view of the image within a hemispherical or spherical field of view. Hardware 15, 16, 17, 10, 19, 20 or combinations thereof may be replaced, as is well known in the art by a program controlled personal computer, mainframe computer, work station computer of a network or the like. Peripheral apparatus for the personal computer may include disk drive, compact disk read only memory (CD ROM), or other media containment apparatus for playing media. Read only memory or applications software loaded via floppy disks incorporating the algorithms of the present invention manipulate the input images. A camera 12 and lens 11 and image capture 13 (shown in FIG. 1) may not be required, as an image may be input via an image scanner, a digital image database, video cassette recorder or other imaging or image storage apparatus.

Figure 3:
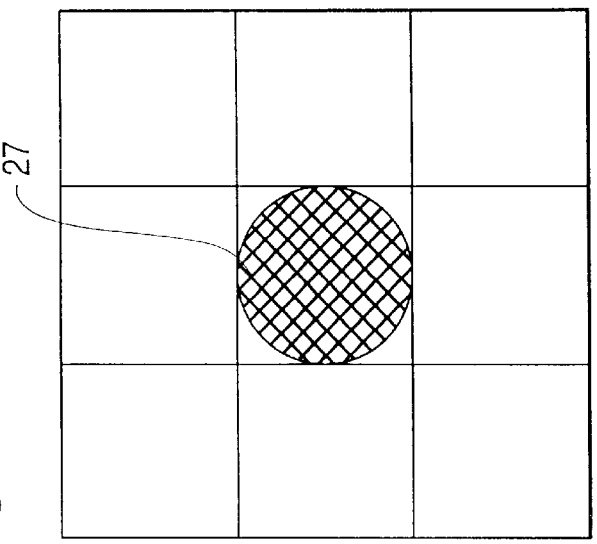
FIG. 2 and FIG. 3 together show the general result of the transformation as a circle in the input fisheye image is transformed and the distortion and perspective corrected and shown in the output as FIG. 3 gives.
Figure 2:
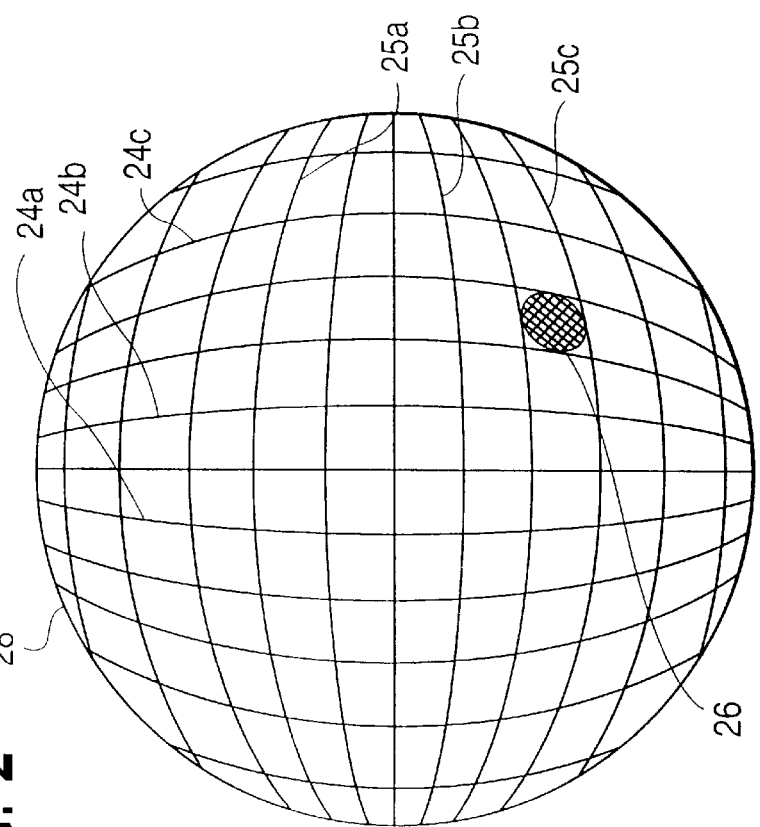

The transformations described in U.S. Pat. No. 5,185,667 correct distortion and perspective from an input hemispherical image shown in FIG. 2 to an output sub region of the image as shown in FIG. 3. In particular, one of subregions of FIG. 2, for example 24a, 24b, 24c, 25a, 25b, 25c, 26 may be selected by a user via control 22 or by computer control 23 and corrected to a planar representation 27 shown in FIG. 3. The detailed mathematical relationships which may be used to accomplish this transformation are described in U.S. Pat. No. 5,185,667. The present invention relates to the perspective correction of an image 28 at an edge of a sphere of two images captured via first and second hemispherical images or via a first image and its mirror image reversal as taught in U.S. application Ser. No., entitled "Method and Apparatus for Simultaneous Capture of a Spherical Image", filed Jun. 23, 1995.

Figure 4:
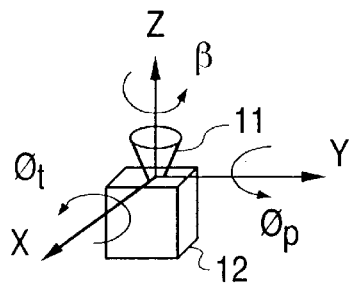
FIGS. 4 and 5 show the camera orientation for the top hemisphere and the nomenclature for the algorithm of the present invention respectively.
Figure 5:
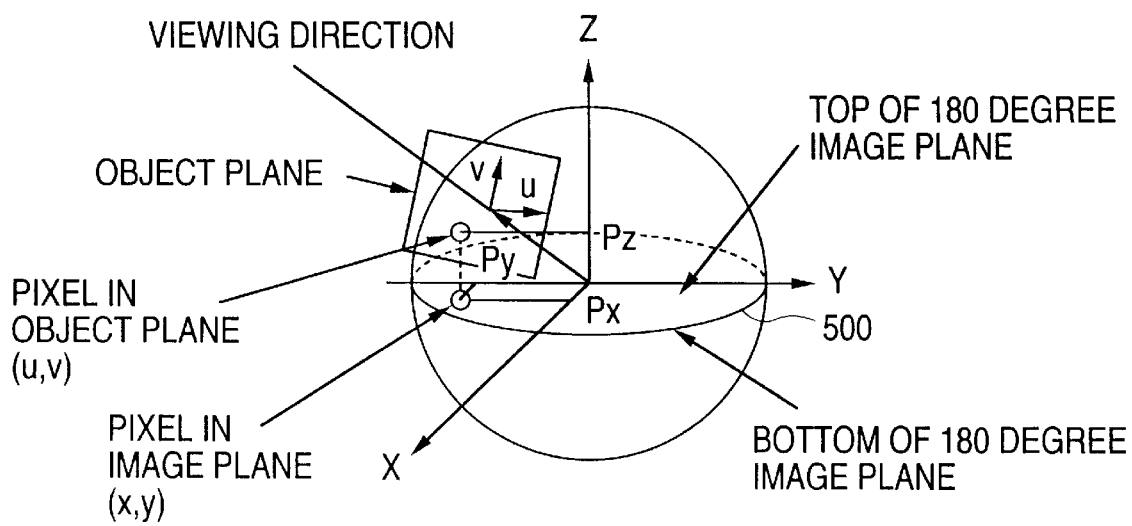

FIG. 4 shows the orientation of the camera 12 of FIG. 1 with lens 11 pointed upward for the capture of the top side or top-most image of the image plane. Again, as used herein, for simplicity, top side and bottom side are used by way of example when left and right or other capture of a spherical image may be accomplished according to the relative position or direction of the camera 12 in relation to an object to be viewed and its image captured. If a second image is used for the other hemisphere, it would be taken (captured) in the exact opposite direction (the lens 11 facing down in this example). The user designates a viewing direction that directs the center of the object, or viewing plane, as shown in FIG. 5. The object plane as used herein means the plane in which an object to be viewed is located and a pixel or picture element in the object plane is given the coordinates (u,v). FIG. 5 shows all the nomenclature used herein for extension of the image transformation into the vertical axis for determination of which side of the image plane a given image falls if two hemispheres are combined to make a spherical representation. The image plane as used herein contains either one or two hemispherical images of radius R. If two hemispherical images are present, they appear on opposite sides of the image plane. When two hemispherical images are present, the front image is oriented such that the positive Z axis emerges from it. The negative Z axis emerges from the back image. A pixel in either the front or back image plane has coordinates (x,y). The perspective corrected (dewarped) image, as seen by the user, is generated in the object plane. The object plane is tangent to a sphere of radius D=mR, where m is the magnification of the image. A vector emanating from the origin of the image plane defines the viewing direction. The direction of this vector is determined by the user selection of pan and tilt. The origin of the object plane is located at the intersection of this vector and the sphere of radius D. The object plane coordinate frame may be rotated by a rotation angle selected by the user. Given a pixel (u,v) in the object plane, the image transformation determines the location of the corresponding pixel (x,y) in the image plane, and to which image the pixel should be mapped (z). If the value for z is positive (or zero) the pixel (u,v) corresponds to pixel (x,y) in the front image. If z is negative, the pixel (u,v) corresponds to pixel (x,y) in the back image. If a single hemisphere is used, then a negative z-axis value designates obtaining the data from the same location of the original hemisphere providing a total immersion for the user, even though only one hemisphere is present.

Digitally, the spherical image is accomplished simply by storing each pixel value (x,y) in the second hemisphere as reversed about a vertical axis at its center so that left appears as right and right appears as left in the second image. Of course, as one views their image in a mirror, there is no change in the vertical axis. Similarly, an image of the second hemisphere is digitally constructed, if, for example represented as coordinate values for a horizontal axis (left and right) and for a vertical axis (top to bottom) at the center of the image, by making positive horizontal values negative values and negative horizontal values positive and leaving vertical axis values the same. Where an image at the border is to be mirrored and two hemispherical images joined, the stored image sample values are approximately equal on the border or edge 500; consequently, the pixel values are matched and stored at the border (seam) so that no seam is visible as will be explained further herein.

Figure 6A:
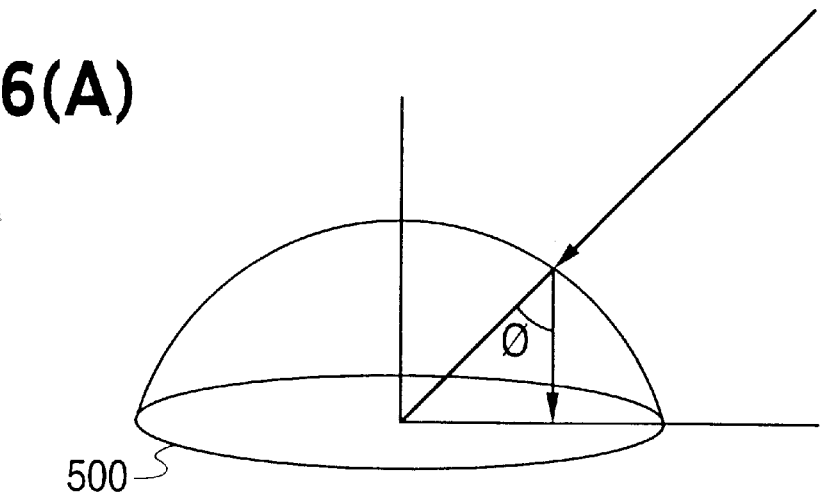
FIGS. 6(a) & 6(b) show an initial lens assumption and a a modified assumption in the algorithm development that allows for exact meshing of the seams on a fisheye lens by modifying the lens assumption to a fisheye lens approximation.
Figure 6B:
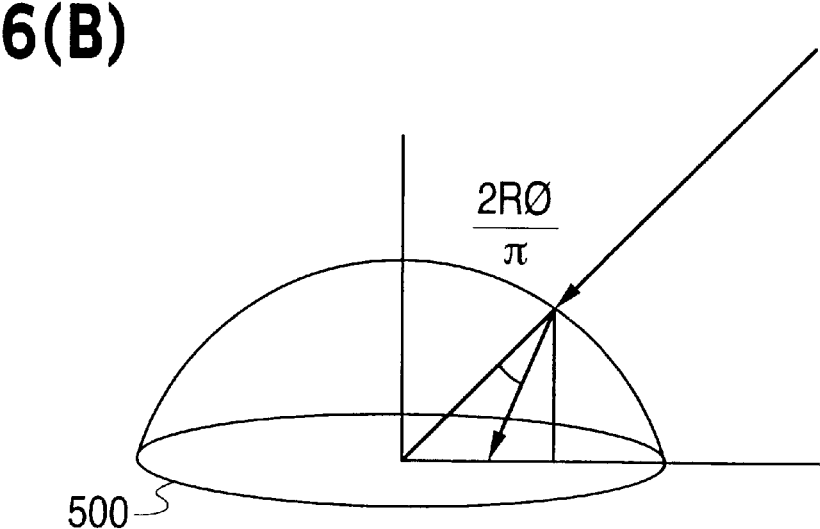

Referring to FIGS. 6(a) and 6(b), a precise calculation of the image transformation is needed at the border or edges of the hemispheres (or around equator 500) to assure that the visual effect of seams are minimized. Firstly, it is important to determine the location of the border from the first and second captured images or as between an image and its mirror image. The relationship for R is given by $\sqrt{X^2+Y^2}$.

As shown in FIG. 6(a), the original Omniview transformation is derived and detailed in U.S. Pat. No. 5,185,667 and assumed an angle ø. It has been modified according to the present invention (see FIG. 6(b)) with the assumption of a fisheye lens rather than thin lens 11 to assure that the meshing of the seams is favorably accomplished. The mathematical relation of the fisheye lens relative to the thin lens is given in FIG. 6(b) such that an assumption that corrects for edge considerations involves a relationship (2Rø)/π in place of ø. It is a necessary assumption for accurate seaming at the edge 500 of the fisheye lens. The assumption utilizes the mathematical relationship for light impinging on a lens and camera as a function of its incident angle. For light rays directed at the lens along the axis of the lens, then ø is 0 degrees. For light rays coming in from the edge of the lens, ø is ninety degrees. The correction for the fisheye lens is that the angle used to calculate the final light ray destination is ø/2, not ø. As a result of this assumption, there has been demonstrated a noticeable improvement at the very edge of the image. As will be further described herein, this ø is related to the angle β, the zenith angle, wherein the old ø was identical to beta but the new ø is actually π/2.

Image files are preferably preprocessed, but may be processed in real time, to determine the border, center and radius of the hemispherical image (depending on the lens used). Seam (or edge) filtering is preferably applied automatically to eliminate a "halo" effect caused on the last few pixels at the rim edge of the image. This rim halo causes the outermost pixels that are part of the image to be dimmed. The thickness of this dimming is only a few pixels, and the filtering is preferably performed in a radial manner (around the line 500) using linear pixel filtering and replication techniques across the radial vector that points from the perimeter of the edge to the center of each of the images. Examples of linear pixel filtering techniques that may be used include a median filter (where the two outer pixels are replaced with the most prevalent pixel value in the region) or an average filter (where you average two pixels together and use the average value), other appropriate mathematical relationship or combinations of such relationships.

So-called "hot spots" are spots identified by a user as the user interacts with the stored data files representing the images. A pixel editing program allows the user to designate regions as areas of interest and name them for later programming reference. This is particularly useful in game design such as exploration games involving motion or movement of a viewer through, for example, a structure. The end user of the present invention controls the direction of viewing by moving a computer mouse, selecting a control button of a keypad or depressing keys of a keyboard in combination, as will be suggested herein, with a computer display for viewing an image per FIG. 9. For example, a hot spot can be designated by clicking a mouse a predetermined number of times within the hot spot and then appropriate sound, text, or other image may be sequentially called and displayed by computer code associated with the hot spot.

Figure 7A:
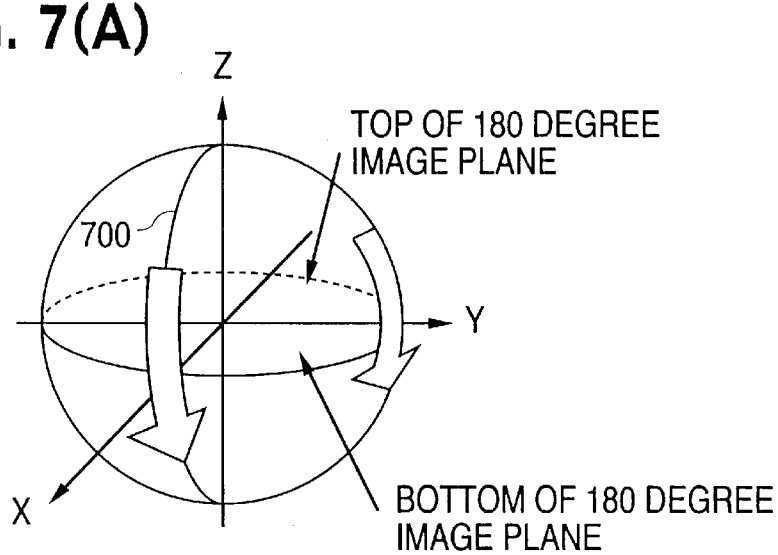
FIG. 7 shows the relationship between the data in each one of the hemispheres and the progression of images across the seam or edge.
Figure 7B:
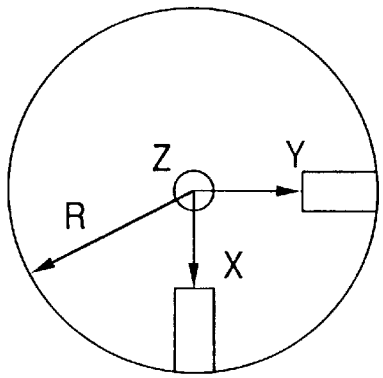
Figure 7C:
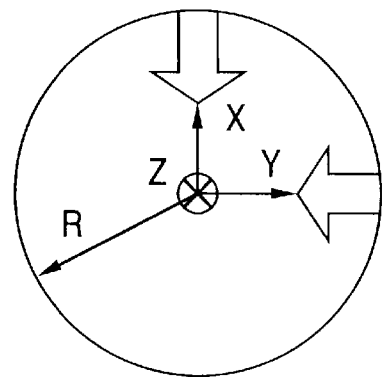

FIG. 7(a) shows how a line 700 that traverses both hemispheres is represented in the data set that captures the images. Referring to FIG. 7(b) and FIG. 7(c), each hemisphere is represented by a circle, one designated top 180 degree image, the other designated bottom 180 degree image. Each has a radius R associated with the optics of the lens. This lens radius R (also referred to herein as an image radius R) is used to determine the amount of distortion correction that is needed by the transformation. A single hemisphere is treated as the top image plane and a second if it is present, is treated as the bottom plane in the image. Radius R is shown in the first equation of FIG. 8 as d=m*R.

The fundamental equations that are used to calculate the image plane addresses and the side of the image plane that is used for a given pixel is given in FIG. 8. The user inputs the pan, tilt, rotation, and magnification by either keypad, mouse, touchscreen, computer control or other input interfaces 22, 23. These inputs along with the data information of image radius R and center is used to transform from the data in the image plane to the output for display on display 21 via the equations provided. Two dimensional interpolation between known exact transformation addresses in the x and y directions or an equivalent process simplifies the calculations, thus improving the computational speed needed to implement the transformations. The checking for the z value determines which image file to obtain the pixel value from. Other assumptions may also be made to improve the computational speed of the algorithm. More importantly, FIG. 8 provides a flowchart of the algorithm. As used in the flowchart, * means multiplication and cos and sin are the well known sine and cosine trigonometric functions. The following defines the variables assigned:

ø$_P$—pan angle

ø$_t$—tilt angle

β—rotation angle m—magnification

R—image radius (u,v)—coordinates of a pixel in the object plane relative to the object plan coordinate frame (x,y)—pixel in the image circle relative to the image plane coordinate frame corresponding to pixel (u,v,) in the object plane $P=(P_x,P_y,P_z)$—location of (u,v) relative to the image plane coordinate fromae a—included angle between the axis of the lens and point P The following substitutions simplify the mathematics for the transforms:

d=m*R

A=cosøp*cosβ+sinøp*sinøt*sinβ

B=cosøp*sinβ−sinøp*sinøt*cosβ

C=cosøt*sinβ

D=cosøt*cosβ

E=d*sinøp*cosøt

F=d*sinøt

G=−sinøp*cosβ+cosøp*sinøt*sinβ

H=sinøp*sinβ+cosøp*sinøt*cosβ

J=d*cosøp*cosøt

In step 801, the input data provided by the user is manipulated to obtain Px, Py and Pz used later. In step 802, the result of $Px^2+Py^2$ is compared with 0.5, and if less than 0.5 in value, x and y are both 0. Otherwise, a, x and y are given the values shown by the represented equations. Step 803 determines which half of the sphere the object is in. If greater than 0, then it is in the top image, and if less, the bottom image given a top/bottom sphere example.

In summary, at least a single image or two images (one image plus its near exact opposite image) are captured having 180 degree fields of view. The captured image (or images) (if analog) is digitized via a scanner. The image could have been directly captured using a photo compact disc, digital camera or digital scanner. Then, the digitized image is processed to determine its border (for seam filtering), its center (the center of the sphere) and its radius (distance to the object plane). Also, during combination, the bottom image values are matched with nearly identical image values of the top image values to form the spherical image from the two hemispheres. The processed spherical image is then stored for use in content applications. Image files are then identified for hotspot correlation with names and description. Once the data file is correlated, the images can be linked together with hot spots and made to correspond with special sound effects, trigger the viewing of a motion picture, cause certain text to be displayed or graphics effects generated to create a multimedia title. The title having been created, the title is compiled. Then, the title can be distributed via CDROM, electronic distribution in real time or via data network. The viewer then can run applications software within the title to create an immersive imaging environment that can be selectively moved through. As a hot spot is entered, the program runs a link to the next spherical image or bubble, and so on, taking the viewer through the title according to the viewer's commands.

Figure 9:
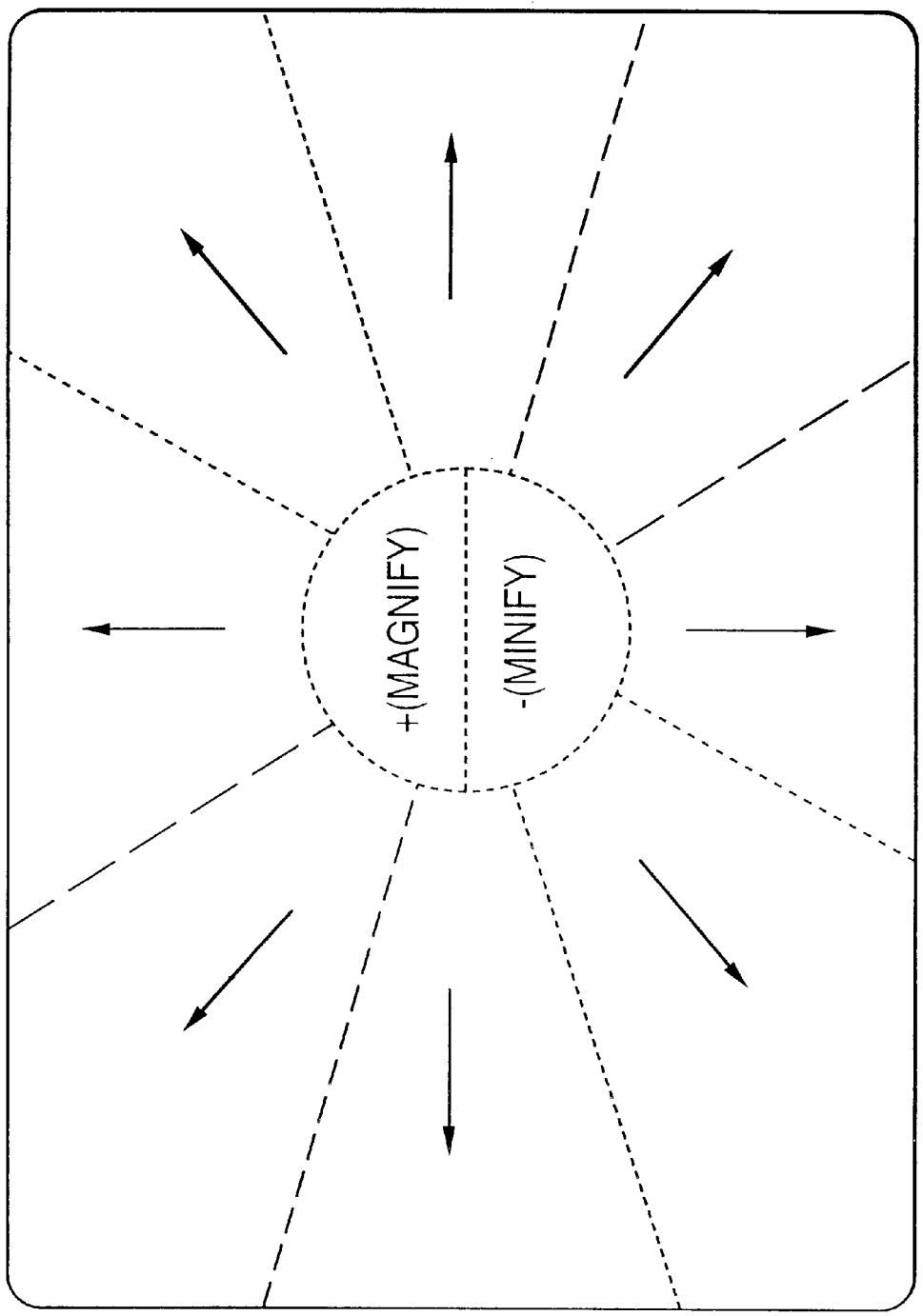
FIG. 9 shows the user interface that allows control of the direction of the image center by the user of the system.

Referring to FIG. 9, one user interface consists of a directional pointer which may be associated with a display. The arrows on the display are exemplary arrows representing the shape of a mouse command or cursor that can be displayed by a display driver and generator when in the depicted region. The pointer changes magnitude and direction based on the distance a cursor is located from the center of the display. A region in the center of the display supports magnification and minification. This interface is shown in FIG. 9, but is by no means all of the possible means that can be used to control the direction of the view. Additional control input can be accomplished via joystick input, head tracking devices (as in head mount virtual reality displays), keyboard control and computer control. Rotation is preferably automatically corrected to maintain the viewer in horizontal relationship with the environment. Pan and tilt can be accomplished via other input means.

Figure 10:
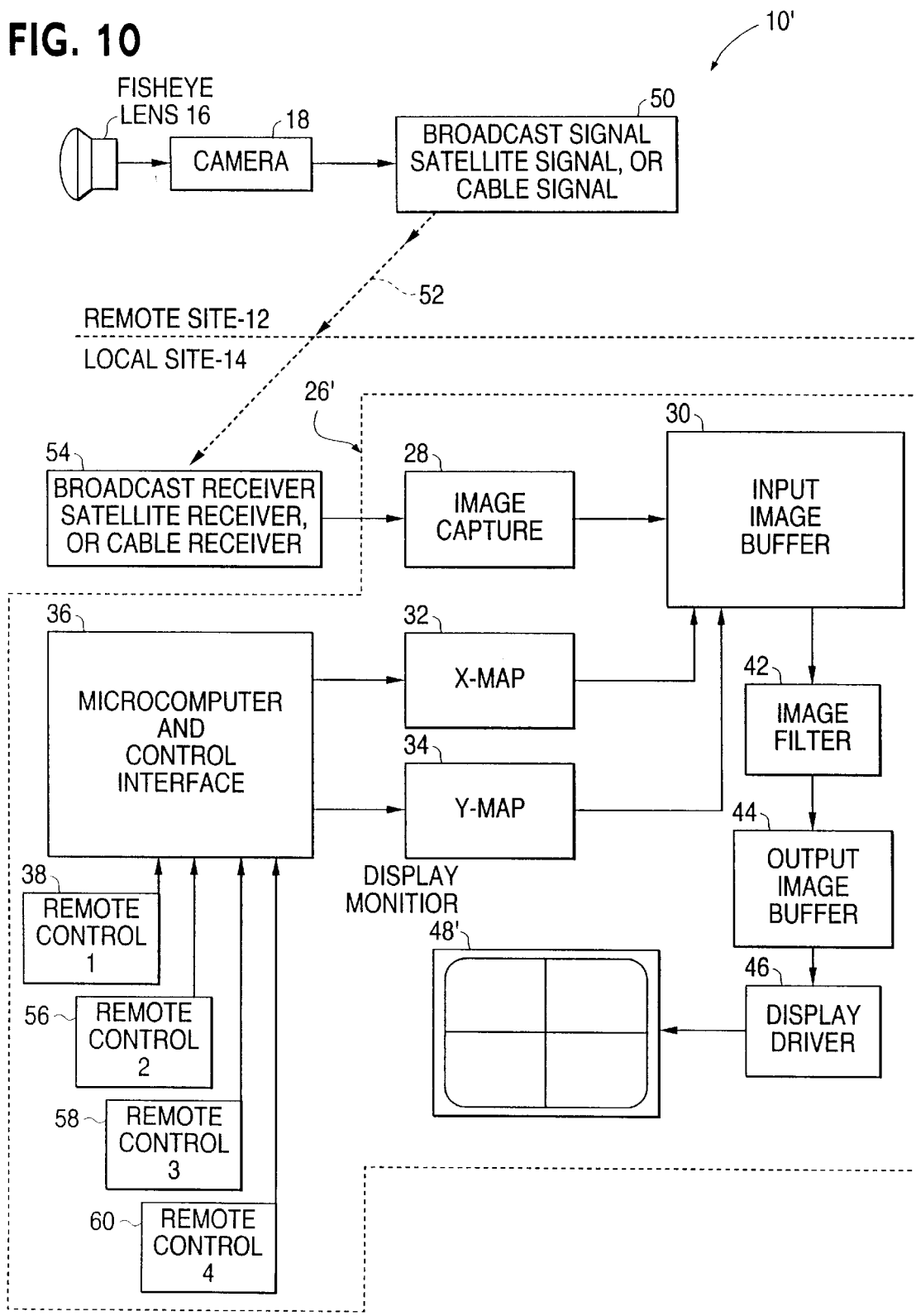
FIG. 10 shows a system approach to the delivery of interactive spherical images allowing individuals to direct their view in any direction as described further by U.S. Pat. No. 5,384,588.

The invention can be incorporated into a system that allows multiple simultaneous users of the information to direct their view in any direction, independent of all other users as shown in FIG. 10. The delivery of these image data, still or full motion video, can be accomplished via broadcast, cable, digital network such as Internet, or on transportable media such as CD-ROM, videotape, or laserdisc from a remote site 12 to a local site 14. For example, at a baseball game at a remote site, two back-to-back (oppositely directed) video cameras equipped with 180 degree lenses capture a spherical image. This spherical image is transmitted to multiple users at local locations. One viewer can direct their focus on the pitcher, another viewer simultaneously at another location can be viewing the catcher while another is viewing someone in the crowd. Each viewer is watching the same ball game in the way they wish to view that ball game.

Figure 11:
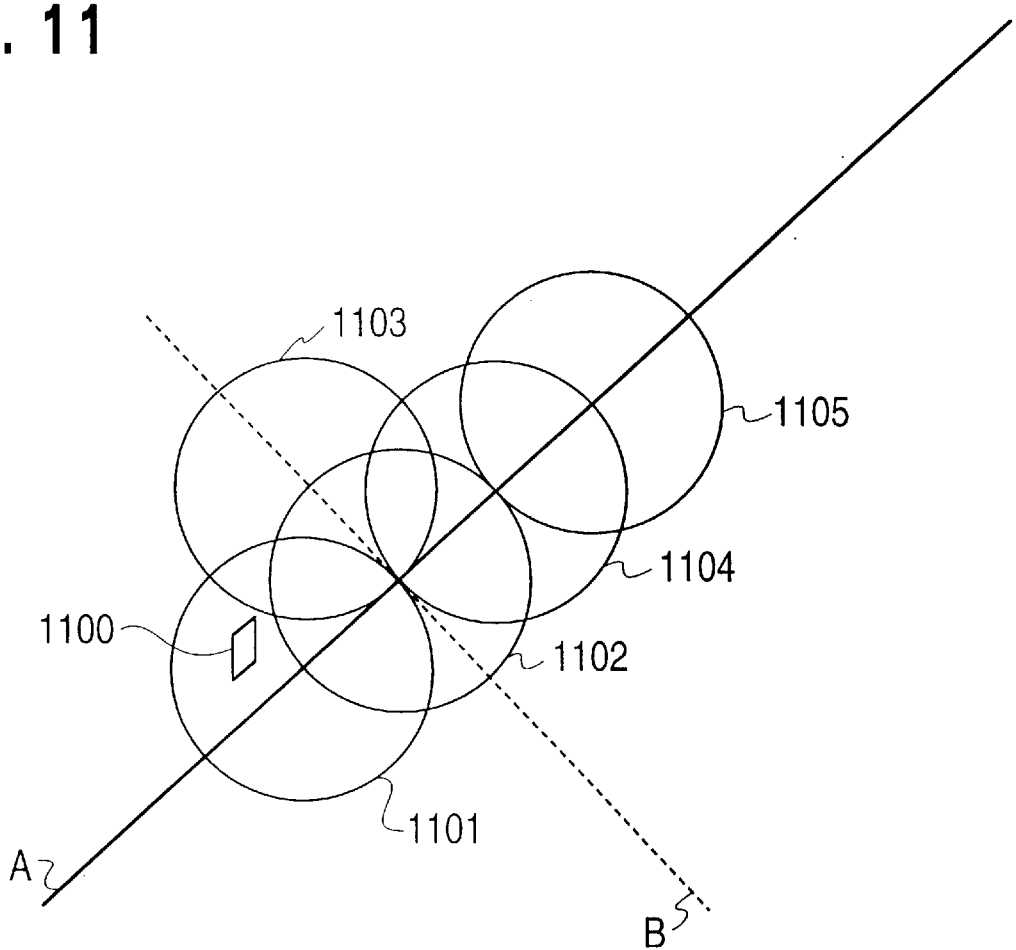
FIG. 11 is a representative diagram useful for describing an application of the present invention for, for example, constructing a tour of a museum and for describing how a user of the present invention would embark on the constructed tour.

Referring now to FIG. 11, the present invention will be further explained in regard to one potential application. Picture a tour of a famous art museum. Prior to construction of such a tour, according to the principles of the present invention, spherical images (or bubbles) are captured in analog or digital form of the entire museum using the techniques in copending patent application Ser. No. 08/494,599, filed Jun. 23, 1995 (attorney docket number 1096.49900). The photographer travels along an axis A (for example, a museum corridor) and captures image bubbles 1101–1105, for example, at predetermined intervals, for example, every ten to fifty feet. (Circles are used to represent spheres in FIG. 11 to avoid drawing clutter.) Present high grain (analog) or digital images can permit as high as (at least) seven times magnification. Thus, a user can focus their attention as they travel a museum corridor on an art object and zoom in on even details of the object. The zoom feature may be used to create an illusion of movement of an observer as they move through a bubble or from bubble to bubble. The faster the zoom, the faster would be the observer's velocity (simulating running). If the ceilings of the museum corridor are high and detail of the ceilings are to be captured and viewed, then, floating or flying can be simulated.

Bubble 1101, for example, will capture an image of painting 1100 hanging on a wall of the corridor. The bubble image 1101 captures the floor, the ceiling, any place one could possibly look. The photographer does not lose any portion of any possible picture. The photographer can follow the A axis and capture bubbles 1102, 1104 and 1105 or another corridor along the B axis, for example, to capture bubble 1103 upon arrival at the A/B junction. The bubbles are large enough to capture anything within it. The bubbles preferably are captured at predetermined intervals or distances and preferably overlap. The photographer captures each spherical view for the entire tour.

Later, these photographs are scanned or otherwise entered into a database for manipulation according to the present invention. Hemispherical images are combined as discussed above, preferably in the form of two opposite images (so that during a tour, the user can go back if they want to view something they may have missed). Now in bubble 1101, it may be appropriate to designate a hot spot when, using the interface of FIG. 9, the user directs their view toward painting 100. As earlier described, any distortion created by the fish eye lens capture of the image is corrected and a clear planar view of the painting 1100 is provided the user. The hot spot, for example, can trigger closed captioning or audible programs to describe the painting 1100. The user may trigger a gateway into a presentation on the artist and then return to the tour. This, as earlier described, is permitted through the use of "hot spot" linking in software to stored audio, graphics or other data for presentation. Another "hot spot" would be at the A/B axis (corridor) junction in sphere 1102. The user pointing their directional cursor in the direction of one corridor along the B axis will permit the user to move to the bubble 1103, and so on. In this manner, an entire tour of a museum may be put together.

Now, the end user of software according to the present invention may obtain access to a database over the Internet or other information highway and have the entire museum tour program database downloaded to their personal computer, television set top terminal or other decoder/presentation device. The program user may select the program from many such programs available to them. The terminal may store and forward pay television charges according to well known techniques to report a charge back to a central billing computer, if the tour program is a pay program, as will now be further discussed by way of example.

In accordance with yet another example, a program user may be standing in a corridor of the Smithsonian Air and Space Museum in Washington, D.C. While the museum tour may be provided free of charge, the tour user may wish to watch a video/audio performance at the "Langley Theater" which charges a $3.50 admission. Again, a "hot spot" may link the decision to a chargeable event and so permit the admission fee to be charged to the user. The acceptance of the pay event is stored in memory along with a means of payment, a code signifying the event's identity and program source. Via well known data return means, the program source (or billing computer) is signalled of the charge for the event and the identity of the viewer and means of payment.

From the foregoing description, it is or should be readily apparent that the described method of operation and apparatus permits a user to obtain a total immersive experience and that the disclosed system achieves the objectives sought. Of course, the foregoing description is that of preferred embodiments of the invention and various changes and modifications may be made without departing from the spirit and scope of the invention as defined by the appended claims. All of the above-referenced U.S. patents and patent applications referenced herein should be deemed to be incorporated by reference as to any subject matter believed to be essential to an understanding of the present invention.

What we claim is:

1. A method of taking a single image captured with a lens having a field of view equal to 180 degrees and creating a 360 degree fully surrounding spherical visualization for an observer comprising the steps of obtaining a first 180 degree image, mirror imaging the first image to obtain a second 180 degree image, combining the first and second images into a spherical image, and storing said combined spherical image in memory, wherein a further step comprises transforming a selected image at the seam between the first image and the second image into a planar image.

2. The method of claim 1 further comprising the preliminary step of digitizing the image data and the mirror imaging step comprises the step of axis reversal of image data to obtain mirror image data.

3. The method of claim 1 further comprising the preliminary step of digitizing the image data and the additional step of seam filtering pixel data at the border between the first and second images.

4. The method of claim 1 further comprising the step of designating active regions for subsequent programming reference.

5. The method of claim 1 further comprising the step of distortion and perspective correction of a selected portion using equations based on a fisheye lens' optical characteristics including said lens' radius R.

6. A method of creating a mirror image to complete a combined seamless spherical image when only one hemisphere is used by a user for interactive viewing comprising the steps of mirror imaging a first 180 degree or greater image to obtain a second 180 degree or greater image, and combining said first and second 180 degree or greater images into said combined seamless spherical image.

* * * * *

UNITED STATES PATENT AND TRADEMARK OFFICE
CERTIFICATE OF CORRECTION

PATENT NO.: 5,990,941

DATED: November 23, 1999

INVENTOR(S): Laban Phelps JACKSON, *et al.*

It is certified that an error appears in the above-identified patent and that said Letters Patent is hereby corrected as shown below:

Title page,
In [63] Related U.S. Application Data,

Delete ",which is a continuation-in-part of application No. 08/386,912, Feb. 8, 1995, which is a continuation of application No. 08/339,663, Nov. 14, 1994, which is a continuation of application No. 08/189,585, Jan. 31, 1994, Pat. No. 5,384,588, which is a continuation-in-part of application No. 07/699,366, May 31, 1991, Pat. No. 5,185,667, and a continuation-in-part of application No. 08/373,446, Jan. 17, 1995, which is a continuation-in-part of application No. 08/189,585, Jan. 31, 1994, Pat. No. 5,384,588".

Signed and Sealed this

Twenty-second Day of August, 2000

*Attest:*

Q. TODD DICKINSON

*Attesting Officer*  *Director of Patents and Trademarks*